US011260829B2

(12) United States Patent
Doi

(10) Patent No.: US 11,260,829 B2
(45) Date of Patent: Mar. 1, 2022

(54) WIPER DEVICE

(71) Applicant: DENSO CORPORATION, Kariya (JP)

(72) Inventor: Yuta Doi, Kosai (JP)

(73) Assignee: DENSO CORPORATION, Kariya (JP)

(*) Notice: Subject to any disclaimer, the term of this patent is extended or adjusted under 35 U.S.C. 154(b) by 149 days.

(21) Appl. No.: 16/482,536

(22) PCT Filed: Jan. 31, 2018

(86) PCT No.: PCT/JP2018/003174
§ 371 (c)(1),
(2) Date: Jul. 31, 2019

(87) PCT Pub. No.: WO2018/147140
PCT Pub. Date: Aug. 16, 2018

(65) Prior Publication Data
US 2020/0198586 A1 Jun. 25, 2020

(30) Foreign Application Priority Data
Feb. 10, 2017 (JP) ............................ JP2017-023256

(51) Int. Cl.

| | |
|---|---|
| ***B60S 1/08*** | (2006.01) |
| ***B60S 1/26*** | (2006.01) |
| ***B60S 1/28*** | (2006.01) |
| *H02P 7/06* | (2006.01) |
| *H02P 29/024* | (2016.01) |
| *H02P 29/66* | (2016.01) |
| *H02P 29/02* | (2016.01) |
| *H02P 6/06* | (2006.01) |

(52) U.S. Cl.
CPC . *B60S 1/08* (2013.01); *B60S 1/26* (2013.01); *B60S 1/28* (2013.01); *H02P 6/06* (2013.01); *H02P 7/06* (2013.01); *H02P 29/02* (2013.01); *H02P 29/0241* (2016.02); *H02P 29/66* (2016.02); *Y10S 318/02* (2013.01)

(58) Field of Classification Search
CPC ...... B60S 1/08; B60S 1/26; B60S 1/28; H02P 29/02; H02P 7/06; H02P 29/66; H02P 29/0241; H02P 7/2913; Y10S 318/02
USPC .................................................... 15/250.001
See application file for complete search history.

(56) References Cited

FOREIGN PATENT DOCUMENTS

| | | |
|---|---|---|
| JP | 2003-146187 A | 5/2003 |
| JP | 2011-131779 A | 7/2011 |

(Continued)

OTHER PUBLICATIONS

Apr. 24, 2018 International Search Report issued in International Patent Application No. PCT/JP2018/003174.

*Primary Examiner* — Katina N. Henson
(74) *Attorney, Agent, or Firm* — Oliff PLC

(57) ABSTRACT

A wiper motor control circuit carries out control in which a driving circuit generates, and supplies to a wiper motor, a voltage that eliminates deviation between a target speed and an actual speed of an output shaft. In a case in which a state in which the deviation between the target speed and the actual speed is greater than or equal to a predetermined threshold value continues for a predetermined time or more, the wiper motor control circuit carries out control that lowers the target speed and in which the driving circuit generates, and supplies to the wiper motor, a voltage that eliminates deviation between the lowered target speed and the actual speed of the output shaft.

9 Claims, 8 Drawing Sheets

(56) References Cited

FOREIGN PATENT DOCUMENTS

| | | | | |
|---|---|---|---|---|
| JP | 2011131779 | A | * | 7/2011 |
| JP | 5122845 | B2 | | 1/2013 |
| JP | 5130303 | B2 | | 1/2013 |

* cited by examiner 10
22
56
58
MICRO-COMPUTER
TEMPERATURE DETECTING CIRCUIT
90
VOLTAGE DETECTING CIRCUIT
SIGNAL INPUTTING CIRCUIT
MEMORY
60
62
48
REVERSE CONNECTION PROTECTING CIRCUIT
64
66
68
C1
C2
Tr1
Tr2
Tr3
Tr4
R1
RT
MOTOR
M
18
72
74
32
70
54
RAIN SENSOR
98
MAIN ECU
92
WIPER SWITCH
50
80

WIPER DEVICE

TECHNICAL FIELD

The present invention relates to a wiper device.

BACKGROUND ART

In a wiper device, rotation of the wiper motor is controlled such that actual speed 192 of the output shaft of the wiper motor is made to follow target speed 190 such as shown in FIG. 7. Concretely, control is carried out that reduces deviation $\epsilon$ between the target speed 190 and the actual speed 192 from operation start position Pα until the wiper blades reach target position Pβ due to the wiping operation. The lower part of FIG. 7 is an example of changes over time in the deviation $\epsilon$ in this control. At time t00 which is when the wiper blades start the wiping operation from the operation start position Pα, and at time t02 which is when the wiper blades reach the target position Pβ, the deviation $\epsilon$ is large. At time t01 which is near the middle of the wiping operation, the deviation $\epsilon$ is substantially 0.

However, if the resistance of the wiper blades that are carrying out reciprocal wiping operation on the windshield glass becomes large due to external force that is based on dirtying, dryness, accumulated snow or the like of the windshield glass, the load on the wiper motor that drives the wiper blades becomes large. Generally, at the motor, the actual speed of the output shaft decreases when the load becomes large. In a state in which the load is high, it is difficult to make the actual speed of the output shaft follow the target speed 190.

FIG. 8 is an explanatory drawing that compares the target speed 190, actual speed 194 and the deviation $\epsilon$ between the both in a case in which the wiper motor is overloaded. In FIG. 8, as a result of the load on the wiper motor becoming large, deviation $\epsilon_\alpha$ arises at time t03, and the actual speed 194 of the output shaft is unstably disordered. In this state as well, if control is carried out that accelerates the actual speed 194 of the output shaft to the target speed 190, at time t04 that is near the target position Pβ, the deceleration in the actual speed 194 cannot be followed, and, at time t05, there is the concern that overrunning, in which the wiper blades deviate from the target position Pβ, will occur.

In the wiper control device disclosed in Japanese Patent No. 5122845 (Patent Document 1), for example, in a case in which an overloaded state is sensed during a HIGH mode in which the wiper blades operate at high speed, the operation speed of the wiper blades is changed to a LOW mode that is lower speed than the HIGH mode, and further, to an INT mode of intermittent operation, and the overloaded state is eliminated.

In the wiper control device disclosed in Japanese Patent No. 5130303 (Patent Document 2), for example, in a case in which an overloaded state is sensed during a HIGH mode in which the wiper blades operate at high speed, the rotational speed of the wiper motor is lowered, and the overloaded state is eliminated.

SUMMARY OF INVENTION

Technical Problem

However, in the wiper control device disclosed in aforementioned Patent Document 1, the process of computing the load of the driving voltage on the wiper motor from the relationship between the duty ratio of the voltage that drives the wiper motor and the rotational speed of the output shaft of the wiper motor is complex, and there is the problem that the computing processing load in this process is high.

Further, in the wiper control device disclosed in aforementioned Cited Document 2, a separate load detector for detecting the load torque of the wiper motor is needed, and there are the problems that the structure of wiper device becomes complex and expensive.

The present invention was made in view of the aforementioned, and an object thereof is to provide a wiper device that, by a simple structure, can smoothly control the wiping operation at the time when a wiper motor is overloaded.

Solution to Problem

In order to achieve the above-described object, a wiper device relating to a first aspect includes: a wiper motor that causes wiper blades to carry out wiping operation; a speed detecting section that detects a rotational speed of the wiper motor; a driving section that generates voltage that is supplied to the wiper motor; and a control section that controls the driving section such that voltage for driving, which eliminates deviation between a target rotational speed expressed by a speed command value and a rotational speed of an output shaft of the wiper motor detected by the speed detecting section, is supplied to the wiper motor, and that, in a case in which a state in which the deviation is greater than or equal to a predetermined value continues for a predetermined time or more, controls the driving section such that voltage for deceleration that is lower than the voltage for driving is supplied to the wiper motor.

In accordance with this wiper device, in a case in which a state in which the deviation between the rotational speed expressed by the speed command value and the actual rotational speed of the output shaft is greater than or equal to a predetermined value continues for a predetermined time, it is considered that the wiper motor is overloaded, and the rotational speed of the output shaft is lowered. Due to the rotational speed of the output shaft being lowered, the load on the wiper motor is reduced, and the output shaft being rotated forcibly against the load is suppressed, and overrunning of the wiper blades can be prevented. As a result, the wiping operation at the time when the wiper motor is overloaded can be controlled smoothly by a simple structure.

In a wiper device relating to a second aspect, in the wiper device relating to the first aspect, the control section controls the driving section such that the voltage for deceleration is supplied to the wiper motor, by lowering the target rotational speed expressed by the speed command value.

In accordance with this wiper device, in a case in which it is considered that the wiper motor is overloaded, the target rotational speed is decreased. By making the rotational speed of the output shaft of the wiper motor follow the lowered target rotational speed, the output shaft being rotated forcibly against the load is suppressed, and the wiping operation can be controlled smoothly.

A wiper device relating to a third aspect has, in the wiper device relating to the first or second aspect, a rotational angle detecting section that detects a rotational angle of the output shaft, wherein the control section controls the driving section such that the voltage for deceleration is supplied to the wiper motor in a case in which the state in which the deviation is greater than or equal to the predetermined value continues for the predetermined time or more and the rotational angle detected by the rotational angle detecting section reaches a predetermined switching angle that is near an intermediate angle of a range of rotational angles of the output shaft.

In accordance with this wiper device, in a case in which the rotational angle of the output shaft of the wiper motor reaches an intermediate angle at which the wiper motor decelerates the rotational speed, by lowering the voltage that is supplied to the wiper motor, the wiping operation can be controlled smoothly at the time when the wiper motor is overloaded.

In a wiper device relating to a fourth aspect, in the wiper device relating to any one of the first through third aspects, the control section controls the driving section such that voltage, which is gradually lowered from the voltage for driving to the voltage for deceleration, is supplied to the wiper motor, and thereafter controls the driving section such that the voltage for deceleration is supplied to the wiper motor.

In accordance with this wiper device, by gradually lowering the voltage, the wiping operation can be controlled smoothly at the time when the wiper motor is overloaded.

DESCRIPTION OF EMBODIMENTS

Figure 1:
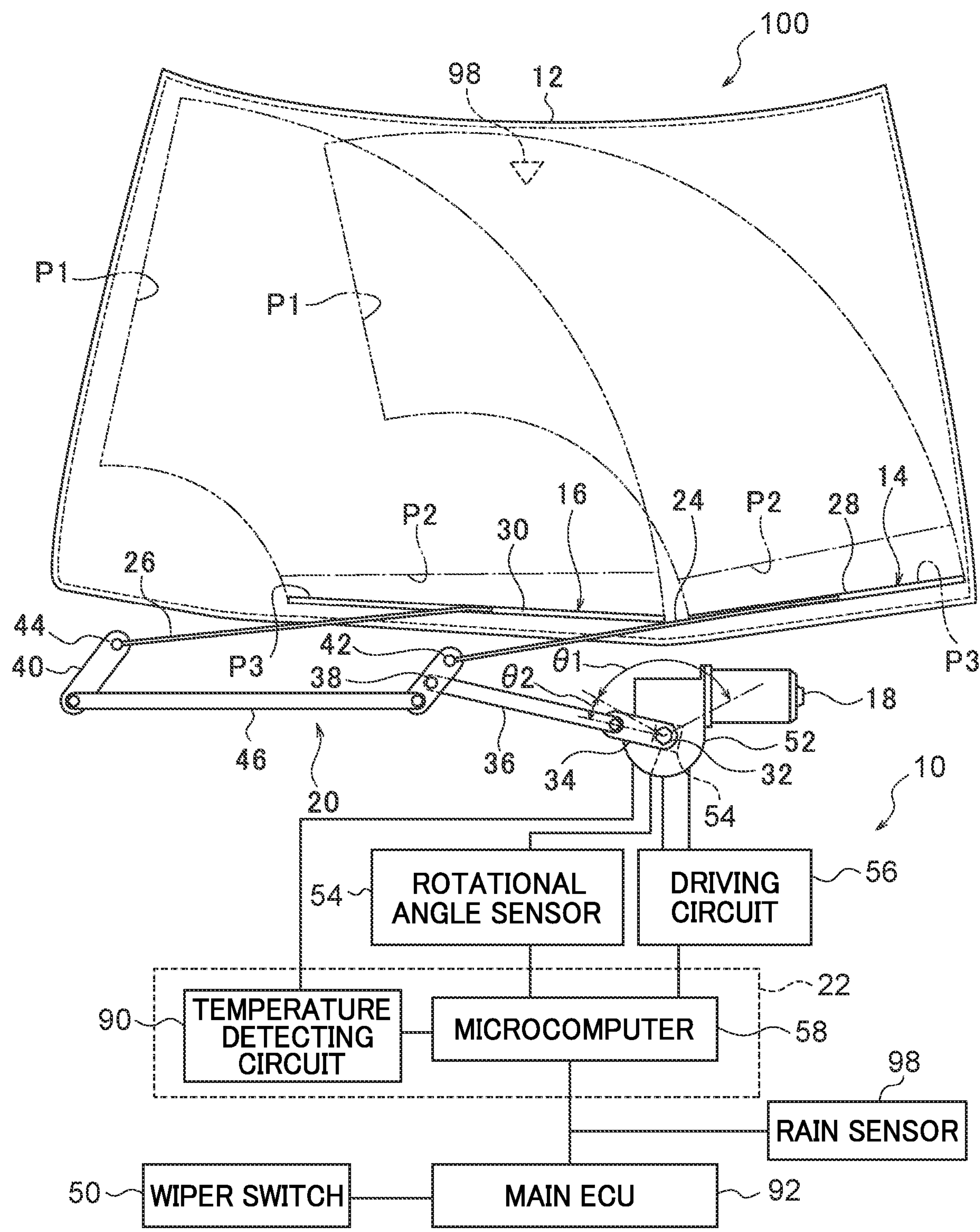
FIG. 1 is a schematic drawing showing the structure of a wiper system that includes a wiper device relating to an embodiment of the present invention.

FIG. 1 is a schematic drawing showing the structure of a wiper system 100 that includes a wiper device 10 relating to a present embodiment. The wiper system 100 is for wiping a windshield glass 12 that is provided at a vehicle such as a passenger automobile or the like for example, and has a pair of wipers 14, 16, a wiper motor 18, a link mechanism 20, and the wiper device 10.

The wipers 14, 16 are structured by wiper arms 24, 26 and wiper blades 28, 30, respectively. The proximal end portions of the wiper arms 24, 26 are respectively fixed to pivot shafts 42, 44 that are described later. The wiper blades 28, 30 are fixed to the distal end portions of the wiper arms 24, 26, respectively.

At the wipers 14, 16, the wiper blades 28, 30 operate reciprocally on the windshield glass 12 accompanying the operation of the wiper arms 24, 26, and the wiper blades 28, 30 wipe the windshield glass 12.

The wiper motor 18 has an output shaft 32 that can rotate forward and reversely via a speed reduction mechanism 52 that is mainly structured by a worm gear. The link mechanism 20 has a crank arm 34, a first link rod 36, a pair of pivot levers 38, 40, the pair of pivot shafts 42, 44, and a second link rod 46.

One end side of the crank arm 34 is fixed to the output shaft 32. The other end side of the crank arm 34 is operatably connected to one end side of the first link rod 36. Further, the other end side of the first link rod 36 is operably connected to a place, which is near to the end that is different than the end having the pivot shaft 42, of the pivot lever 38. The both ends of the second link rod 46 are operatably connected to the end, which is different than the end having the pivot shaft 42, of the pivot lever 38 and the end, which corresponds to that end of the pivot lever 38, at the pivot lever 40, respectively.

Further, the pivot shafts 42, 44 are operatably supported by unillustrated pivot holders that are provided at the vehicle body. The wiper arms 24, 26 are respectively fixed via the pivot shafts 42, 44 to the ends, which have the pivot shafts 42, 44, of the pivot levers 38, 40.

At the wiper system 100 that includes the wiper device 10 relating to the present embodiment, when the output shaft 32 is rotated forward and reversely by rotational angle θ1 of a predetermined range, the rotational force of this output shaft 32 is transmitted via the link mechanism 20 to the wiper arms 24, 26, and, accompanying the reciprocal operation of the wiper arms 24, 26, the wiper blades 28, 30 reciprocally operate between lower reversal positions P2 and upper reversal positions P1 on the windshield glass 12. The value of θ1 can be any of various values depending on the structure of the link mechanism of the wiper device 10 and the like, and, in the present embodiment, is 140° as an example.

In the wiper system 100 that includes the wiper device 10 relating to the present embodiment, as shown in FIG. 1, when the wiper blades 28, 30 are positioned at stored positions P3, the crank arm 34 and the first link rod 36 are a linear structure.

The stored positions P3 are provided beneath the lower reversal positions P2. Due to the output shaft 32 rotating θ2 from the state in which the wiper blades 28, 30 are at the lower reversal positions P2, the wiper blades 28, 30 operate to the stored positions P3. The value of θ2 can be any of various values depending on the structure of the link mechanism of the wiper device 10 and the like, and, in the present embodiment, is 10° as an example.

Note that, when θ2 is "0", the lower reversal positions P2 and the stored positions P3 coincide, and the wiper blades 28, 30 are stopped at the lower reversal positions P2 and are stored.

A wiper motor control circuit 22 for controlling rotation of the wiper motor 18 is connected to the wiper motor 18. The wiper motor control circuit 22 relating to the present embodiment includes a microcomputer and a temperature detecting circuit 90 that detects the temperature of the circuit board of the wiper motor 18 on the basis of signals outputted from a thermistor that is provided at the circuit board.

A microcomputer 58 of the wiper motor control circuit 22 controls the rotational speed of the wiper motor 18 on the basis of the rotational speed of the output shaft 32 of the wiper motor 18 and the results of sensing of a rotational angle sensor 54 that senses the rotational angle. The rotational angle sensor 54 is provided within the speed reduction mechanism 52 of the wiper motor 18, and converts the magnetic field (magnetic force) of a sensor magnet, which rotates interlockingly with the output shaft 32, into current and detects the rotational angle.

As described above, the wiper motor 18 relating to the present embodiment has the speed reduction mechanism 52. Therefore, the rotational speed and the rotational angle of the output shaft 32 are not the same as the rotational speed and the rotational angle of the wiper motor main body. However, in the present embodiment, because the wiper motor main body and the speed reduction mechanism 52 are structured integrally and inseparably, hereinafter, the rotational speed and the rotational angle of the output shaft 32 are considered to be the rotational speed and the rotational angle of the wiper motor 18.

The microcomputer 58 can compute the position of the wiper blades 28, 30 on the windshield glass 12 from the rotational angle of the output shaft 32 detected by the rotational angle sensor 54, and controls a driving circuit 56 such that the rotational speed of the output shaft 32 varies in accordance with that position. The driving circuit 56 is a circuit that generates voltage that is applied to the wiper motor 18 on the basis of control of the wiper motor control circuit 22, and switches the electric power of the battery of the vehicle that is the power source, and generates voltage that is applied to the wiper motor 18.

Further, a wiper switch 50 is connected to the microcomputer 58 of the wiper motor control circuit 22 via a main ECU (Electronic Control Unit) 92 that carries out control of the engine of the vehicle, and the like. The wiper switch 50 is a switch that turns on or off the electric power that is supplied from the battery of the vehicle to the wiper motor 18. The wiper switch 50 can switch among a low-speed operation mode selection position (LOW) of operating the wiper blades 28, 30 at a low speed, a high-speed operation mode selection position (HIGH) of operating the wiper blades 28, 30 at a high speed, an intermittent operation mode selection position (INT) of operating the wiper blades 28, 30 intermittently at a uniform interval, an AUTO (automatic) operation mode selection position (AUTO) of operating the wiper blades 28, 30 in a case in which a rain sensor 98 senses rain drops, and a stop mode selection position (OFF). Further, the wiper switch 50 outputs command signals for rotating the wiper motor 18 in accordance with the selection positions of the respective modes, to the microcomputer 58 via the main ECU 92. For example, at the high-speed operation mode selection position, the wiper switch 50 causes the the wiper motor 18 to rotate at a high-speed, and, at the low-speed operation mode selection position, the wiper switch 50 causes the wiper motor 18 to rotate at a low speed, and, at the intermittent operation mode selection position, the wiper switch 50 causes the wiper motor 18 to rotate intermittently.

When a signal, which is outputted from the wiper switch 50 in accordance with the selection position of each mode, is inputted to the microcomputer 58 via the main ECU 92, the microcomputer 58 carries out control that corresponds to the command signal from the wiper switch 50. Concretely, on the basis of the command signal from the wiper switch 50, the microcomputer 58 reads a rotation signal of the output shaft 32 and controls the voltage applied to the wiper motor 18, so that the wiper blades 28, 30 operate at the desired reciprocal wiping period.

The rain sensor 98, which senses water on the surface of the windshield glass 12 and outputs a signal corresponding to the amount of water on the surface of the windshield glass 12, is provided at the surface that is at the vehicle cabin inner side of the windshield glass 12. The rain sensor 98 is connected to the microcomputer 58.

The rain sensor 98 includes, for example, an LED that is an infrared light emitting element, a photodiode that is a light receiving element, a lens that forms an optical path of infrared light, and a control circuit. The infrared light that is radiated from the LED is totally reflected at the windshield glass 12, but, when water drops exist on the surface of the windshield glass 12, some of the infrared light passes-through the water drops and is emitted to the exterior, and therefore, the reflected amount at the windshield glass 12 decreases. As a result, the light amount that enters the photodiode that is the light receiving element decreases. In the present embodiment, the amount of rain is computed from the amount of decrease in the received amount of ultraviolet light at the photodiode, and control of the wiper device 10 is carried out.

Figure 2:
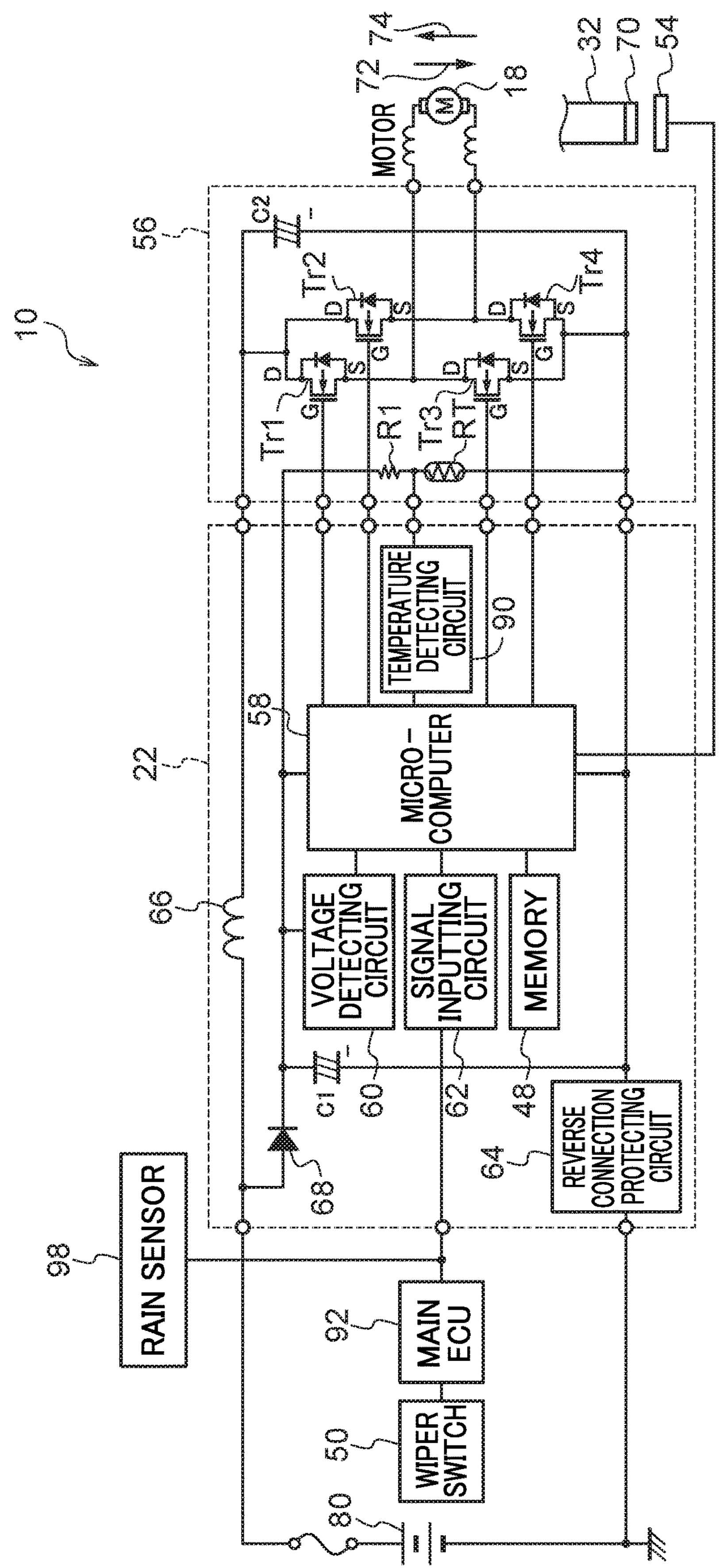
FIG. 2 is a block drawing showing an overview of an example of the structure of the wiper device relating to the embodiment of the present invention.

FIG. 2 is a block drawing showing an overview of an example of the structure of the wiper device 10 relating to the present embodiment. The wiper motor 18 shown in FIG. 2 is, as an example, a DC brush motor.

The wiper device 10 shown in FIG. 2 includes the driving circuit 56 that generates voltage to be applied to the terminals of the winding of the wiper motor 18, and the wiper motor control circuit 22 that has the microcomputer 58 that controls the on and off of the switching elements that structure the driving circuit 56. Electric power of a battery 80 is supplied to the microcomputer 58 via diode 68, and the voltage of the supplied electric power is sensed by a voltage detecting circuit 60 that is provided between the diode 68 and the microcomputer 58, and the results of sensing are outputted to the microcomputer 58. Further, an electrolytic capacitor C1, whose one end is connected between the diode 68 and the microcomputer 58 and whose another end (−) is grounded, is provided. The electrolytic capacitor C1 is a capacitor for stabilizing the power supply of the microcomputer 58. The electrolytic capacitor C1 protects the microcomputer 58 by, for example, storing sudden high voltage such as a surge or the like and releasing it to a ground region.

A signal for instructing the rotational speed of the wiper motor 18 is inputted from the wiper switch 50 via the main ECU 92 to the microcomputer 58 via a signal inputting circuit 62. Because the signal outputted from the wiper switch 50 is an analog signal, this signal is digitized at the signal inputting circuit 62 and is inputted to the microcomputer 58.

The rotational angle sensor 54, which senses the magnetic field of a sensor magnet 70 that varies in accordance with the rotation of the output shaft 32, is connected to the microcomputer 58. By computing the rotational angle of the output shaft on the basis of the signal that the rotational angle sensor 54 outputs, the microcomputer 58 specifies the positions of the wiper blades 28, 30 on the windshield glass 12.

Moreover, the microcomputer 58 refers to data of the rotational speed of the wiper motor 18 that is stored in the memory 48 and that is prescribed in accordance the positions of the wiper blades 28, 30, and controls the driving circuit 56 such that the rotation of the wiper motor 18 becomes a number of revolutions that corresponds to the specified positions of the wiper blades 28, 30.

As shown in FIG. 2, the driving circuit 56 uses, as switching elements, transistors Tr1, Tr2, Tr3, Tr4 that are N-type FETs (field effect transistors). The drains of the transistor Tr1 and the transistor Tr2 are respectively connected to the battery 80 via a noise preventing coil 66, and the sources are respectively connected to the drains of the transistor Tr3 and the transistor Tr4. Further, the sources of the transistor Tr3 and the transistor Tr4 are grounded.

Further, the source of the transistor Tr1 and the drain of the transistor Tr3 are connected to one end of the winding of the wiper motor 18, and the source of the transistor Tr2 and the drain of the transistor Tr4 are connected to another end of the winding of the wiper motor 18.

Due to a high-level signal being inputted to the respective gates of the transistor Tr1 and the transistor Tr4, the transistor Tr1 and the transistor Tr4 are turned on, and CW current 72, which operates the wiper blades 28, 30 clockwise as seen from the vehicle chamber side for example, flows to the wiper motor 18. Moreover, when one of the transistor Tr1 and the transistor Tr4 is controlled to be on, due to the other being PWM (Pulse Width Modulation) controlled, the voltage of the CW current 72 can be modulated by on/off control in small increments.

Further, due to high-level signals being inputted to the respective gates of the transistor Tr2 and the transistor Tr3, the transistor Tr2 and the transistor Tr3 are turned on, and CCW current 74, which operates the wiper blades 28, 30 counterclockwise as seen from the vehicle cabin side for example, flows to the wiper motor 18. Moreover, when one of the transistor Tr2 and the transistor Tr3 is controlled to be on, due to the other being PWM (Pulse Width Modulation) controlled, the voltage of the CCW current 74 can be modulated by on/off control in small increments.

A voltage divider, which is structured by a resistor R1 and a thermistor RT that is for temperature sensing, are packaged on the circuit board of the driving circuit 56. The thermistor RT is an element whose resistance value varies in accordance with temperature. When the resistance value of the thermistor RT varies, the voltage divided by the voltage divider that is structured by the thermistor RT and the resistor R1 varies. At the microcomputer 58, the voltage, which is divided at this voltage divider, is converted at the temperature detecting circuit 90 into a digital signal that the microcomputer 58 can process, and is inputted to the microcomputer 58. The microcomputer 58 computes the temperature of the circuit board on which the driving circuit 56 is packaged from the variation in the voltage that is divided at the voltage divider that is structured by the thermistor RT and the resistor R1. In the present embodiment, the temperature that the thermistor RT senses is handled as a physical amount that expresses the load of the wiper motor 18.

The thermistor RT may be provided at a place other than the circuit board on which the driving circuit 56 is packaged, provided that it is a place where the temperature varies in accordance with the load of the wiper motor 18 and heat generation is notable. For example, if possible, the thermistor RT may be packaged at the interior of the housing of the wiper motor 18.

In the present embodiment, a reverse connection protecting circuit 64 and the noise preventing coil 66 are provided between the battery 80 that is the power source and the driving circuit 56, and an electrolytic capacitor C2 is provided in parallel with the driving circuit 56. The noise preventing coil 66 is an element for suppressing noise that arises due to switching of the driving circuit 56.

The electrolytic capacitor C2 is an element that mitigates noise arising from the driving circuit 56, and that, by storing sudden high voltage such as a surge or the like and releasing it to a ground region, prevents excessive current from being inputted to the driving circuit 56.

The reverse connection protecting circuit 64 is a circuit for protecting the elements that structure the wiper device 10, in a case in which the positive electrode and the negative electrode of the battery 80 are connected oppositely to the case shown in FIG. 2. The reverse connection protecting circuit 64 is, as an example, structured by a so-called diode-connected FET in which its own drain and gate are connected, or the like.

Figure 3:
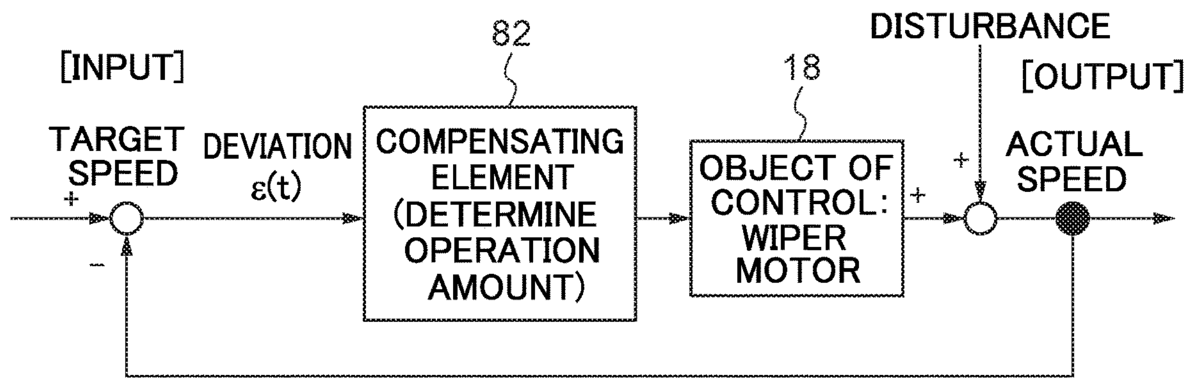
FIG. 3 is a block drawing of a feedback control model that takes into consideration actual speed and disturbance at a wiper motor control circuit of the wiper device relating to the embodiment of the present invention.

FIG. 3 is a block drawing of a feedback control model that takes into consideration the actual speed and disturbance at the wiper motor control circuit 22 of the wiper device 10 relating to the present embodiment. A target speed that is based on operation of the wiper switch 50 is inputted as a command signal to the input side shown in FIG. 3, and the actual speed of the output shaft 32 that is computed from the results of sensing of the rotational angle sensor 54 are fed-back to the input side shown in FIG. 3. In most cases, the target speed and the actual speed do not coincide, and therefore, deviation $\epsilon(t)$ arises as a result of comparing the both. PI control (Proportional-Integral Controller) that causes the actual speed to near the target speed by reducing the deviation $\epsilon(t)$ that arises is used in the present embodiment. The PI control is carried out at a compensating element section 82, and the driving circuit 56 is controlled such that voltage of a duty ratio determined by the PI control is applied to the coil of the wiper motor 18.

Figure 8:
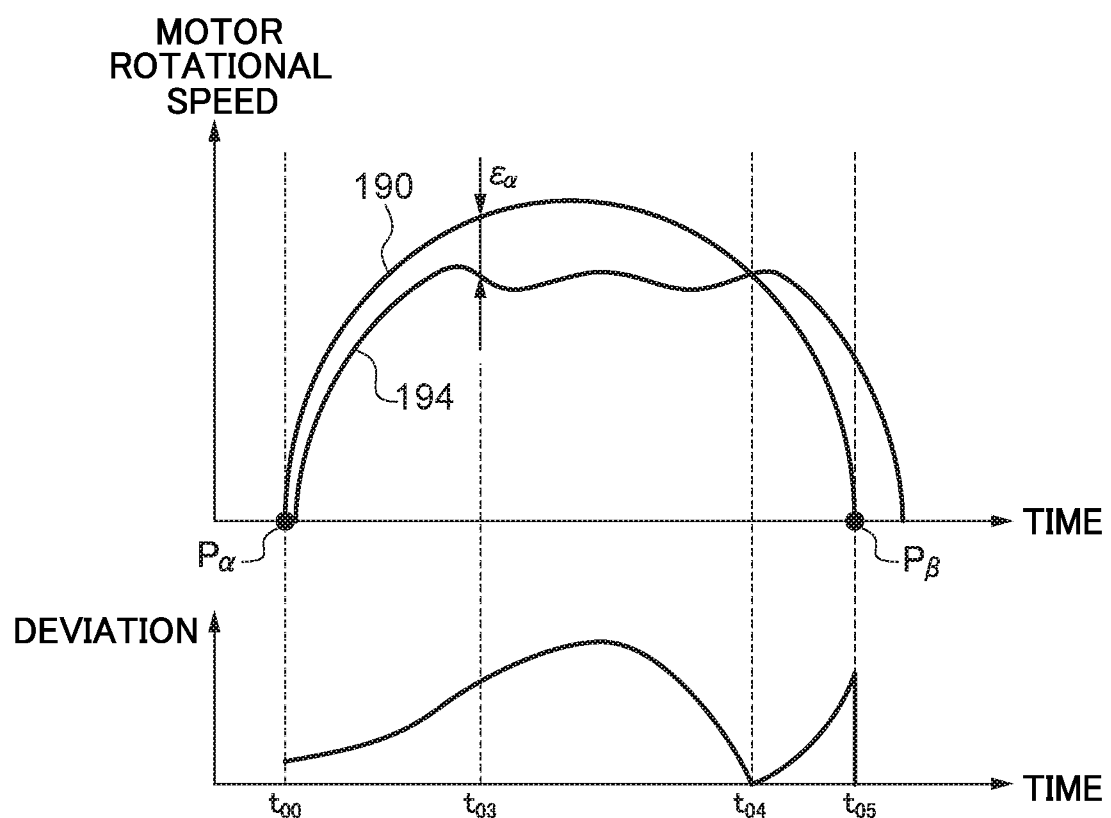
FIG. 8 is an explanatory drawing comparing target speed, actual speed, and deviation between the both in a case in which the wiper motor is overloaded.

However, when the resistance of the wiper blades 28, 30 that carry out reciprocal wiping operation becomes large due to external force that is based on dirtying, dryness, accumulated snow or the like of the windshield glass 12, the actual speed of the output shaft 32 of the wiper motor 18 decreases, and the deviation $\epsilon(t)$ becomes large. If there is leeway in the torque of the output shaft 32 of the wiper motor 18, the enlarged deviation $\epsilon(t)$ can be eliminated by PI control. However, in a case in which there is no leeway in the torque of the output shaft 32, the enlarged deviation $\epsilon(t)$ cannot be eliminated even if the output of the wiper motor 18 is raised, and there is the concern that the wiper blades 28, 30 will overrun as shown in previously-described FIG. 8.

Figure 4:
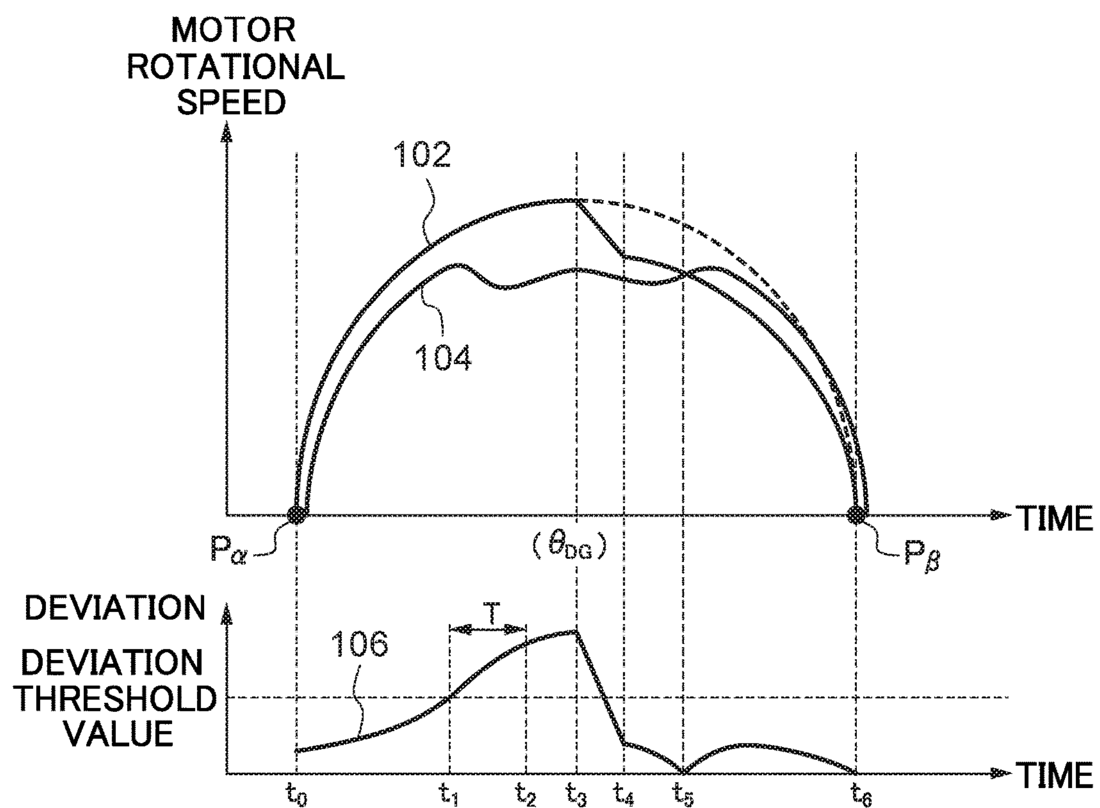
FIG. 4 is an explanatory drawing that compares target speed, actual speed, and deviation between the both in a case in which the wiper motor is overloaded, at the wiper device relating to the embodiment of the present invention.

FIG. 4 is an explanatory drawing that compares target speed 102, actual speed 104, and deviation 106 between the both in a case in which the wiper motor 18 is overloaded, at the wiper device 10 relating to the present embodiment. As shown in FIG. 4, at time to, the wiper blades 28, 30 start the wiping operation from operation start position $P\alpha$, and thereafter, at time t1, the deviation 106 between the target speed 102 and the actual speed 104 becomes greater than or equal to a deviation threshold value. In a case in which the state in which the deviation 106 is greater than or equal to the deviation threshold value continues for predetermined time T or more, processing that decelerates the target speed 102 is executed in the present embodiment. Concretely, as shown in FIG. 4, at time t2, in a case in which the state in which the deviation 106 is greater than or equal to the deviation threshold value continues for the predetermined time T or more, processing that decelerates the target speed 102 from time t3, at which the rotational angle of the output shaft 32 reaches a predetermined switching angle $\theta_{DG}$, is started, and the decelerating of the target speed 102 is completed at time t4. Then, from time t4 on, PI control that eliminates the deviation 106 between the decelerated target speed 102 and the actual speed 104 is carried out.

As a result, during the period from time t5 to time t6, although the actual speed 104 becomes slightly larger than the target speed 102, the wiper blades 28, 30 reach target position PP without fatally overrunning. The degrees of the deviation threshold value, the predetermined time T, the switching angle $\theta_{DG}$, and the decelerating of the target speed 102 differ in accordance with the specifications of the wiper device 10, and therefore are concretely determined through examination in the design stage and testing using actual devices. For example, the switching angle $\theta_{DG}$ may be an intermediate angle between the rotational angle of the output shaft 32 at the operation start position Pα and the rotational angle of the output shaft 32 at the target position Pβ, i.e., may be an intermediate angle in the range of rotational angles of the output shaft 32. Note that the operation start position Pα is any of the stored position P3, the lower reversal position P2 and the upper reversal position P1. In a case in which the operation start position Pα is either of the stored position P3 or the lower reversal position P2, the target position Pβ is the upper reversal position P1. In a case in which the operation start position Pα is the upper reversal position P1, the target position Pβ is either of the lower reversal position P2 or the stored position P3. Because the wiper blades 28, 30 carry out reciprocal wiping operation on the windshield glass 12, in the explanation of the control of the present embodiment, the respective reversal positions are identified as the operation start position Pα and the target position Pβ, without distinction between the upper reversal position P1, the lower reversal position P2 and the stored position P3.

Figure 5A:
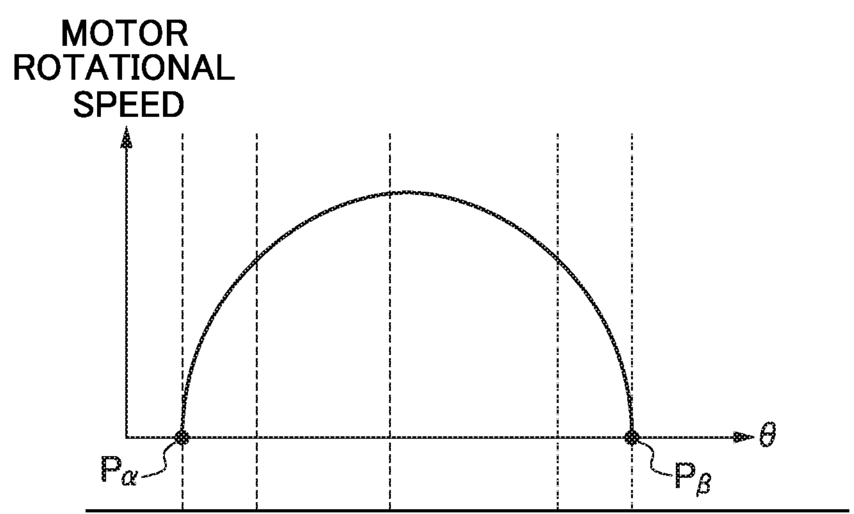
FIG. 5A is an explanatory drawing showing an example of target speed in a high-speed operation mode, with the rotational angle of an output shaft being on the horizontal axis, in the embodiment of the present invention.
Figure 5B:
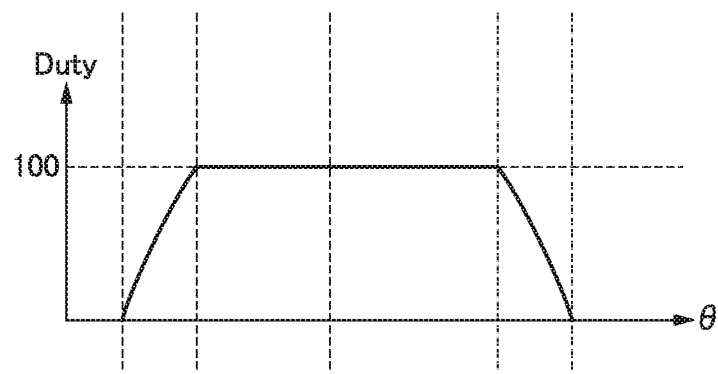
FIG. 5B is an explanatory drawing showing changes in the duty ratio in the high-speed operation mode in the present embodiment.
Figure 5C:
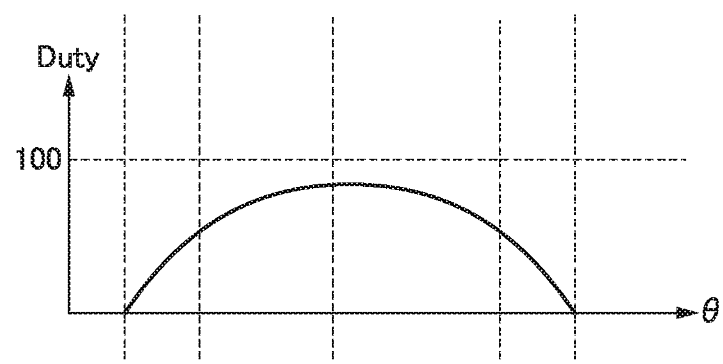
FIG. 5C is an explanatory drawing showing changes in the duty ratio in a low-speed operation mode in the present embodiment.
Figure 5D:
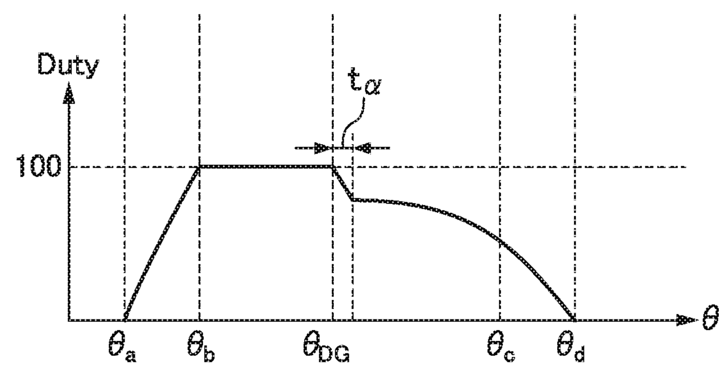
FIG. 5D is an explanatory drawing respectively showing changes in the duty ratio in a case in which the wiper motor is overloaded in the high-speed operation mode in the present embodiment.

FIG. 5A is an explanatory drawing showing an example of the target speed in a high-speed operation mode, with the rotational speed of the output shaft 32 in the present embodiment being on the horizontal axis, FIG. 5B is an explanatory drawing showing changes in the duty ratio in the high-speed operation mode in the present embodiment, FIG. 5C is an explanatory drawing showing changes in the duty ratio in a low-speed operation mode in the present embodiment, and FIG. 5D is an explanatory drawing showing changes in the duty ratio in a case in which the wiper motor 18 is overloaded in the high-speed operation mode in the present embodiment, respectively.

As shown in FIG. 5A, the target speed of the wiper device 10 relating to the present embodiment is a curve that is convex upwardly. The target speed differs in the high-speed operation mode and the low-speed operation mode, but if the point that the former of these respectively prescribed motor rotational speeds is higher speed is excluded, an upwardly-convex curve is common to both. Therefore, detailed explanation of the target speed in the low-speed operation mode will be omitted.

As shown in FIG. 5B, the duty ratio in the high-speed operation mode increases monotonically from rotational angle $\theta_a$ that expresses the operation start position Pα, and becomes a maximum of 100% at rotational angle $\theta_b$, and decreases monotonically from rotational angle $\theta_c$, and becomes 0 at rotational angle $\theta_d$ that expresses the target position Pβ.

As shown in FIG. 5C, the duty ratio in the low-speed operation mode increases monotonically from the rotational angle $\theta_a$ that expresses the operation start position Pα, and becomes a maximum in a vicinity of an intermediate angle between the rotational angle $\theta_a$ and the rotational angle $\theta_d$, and thereafter changes to a monotonic decrease, and becomes 0 at the rotational angle $\theta_d$ that expresses the target position Pβ.

As shown in FIG. 5D, the duty ratio in a case in which the wiper motor 18 becomes overloaded in the high-speed operation mode in the present embodiment is applied to a case in which a state in which the deviation 106 is greater than or equal to the deviation threshold value continues for the predetermined time T or more, such as shown in FIG. 4. Processing is carried out that starts lowering of the duty ratio at the time when the rotational angle of the output shaft 32 reaches the predetermined switching angle $\theta_{DG}$, and lowers the duty ratio gradually during predetermined time tα. Due to the lowering of the effective voltage due to this lowering of the duty ratio, the rotation of the wiper motor 18 is controlled such that the actual speed 104 follows the target speed 102 of FIG. 4.

Figure 6:
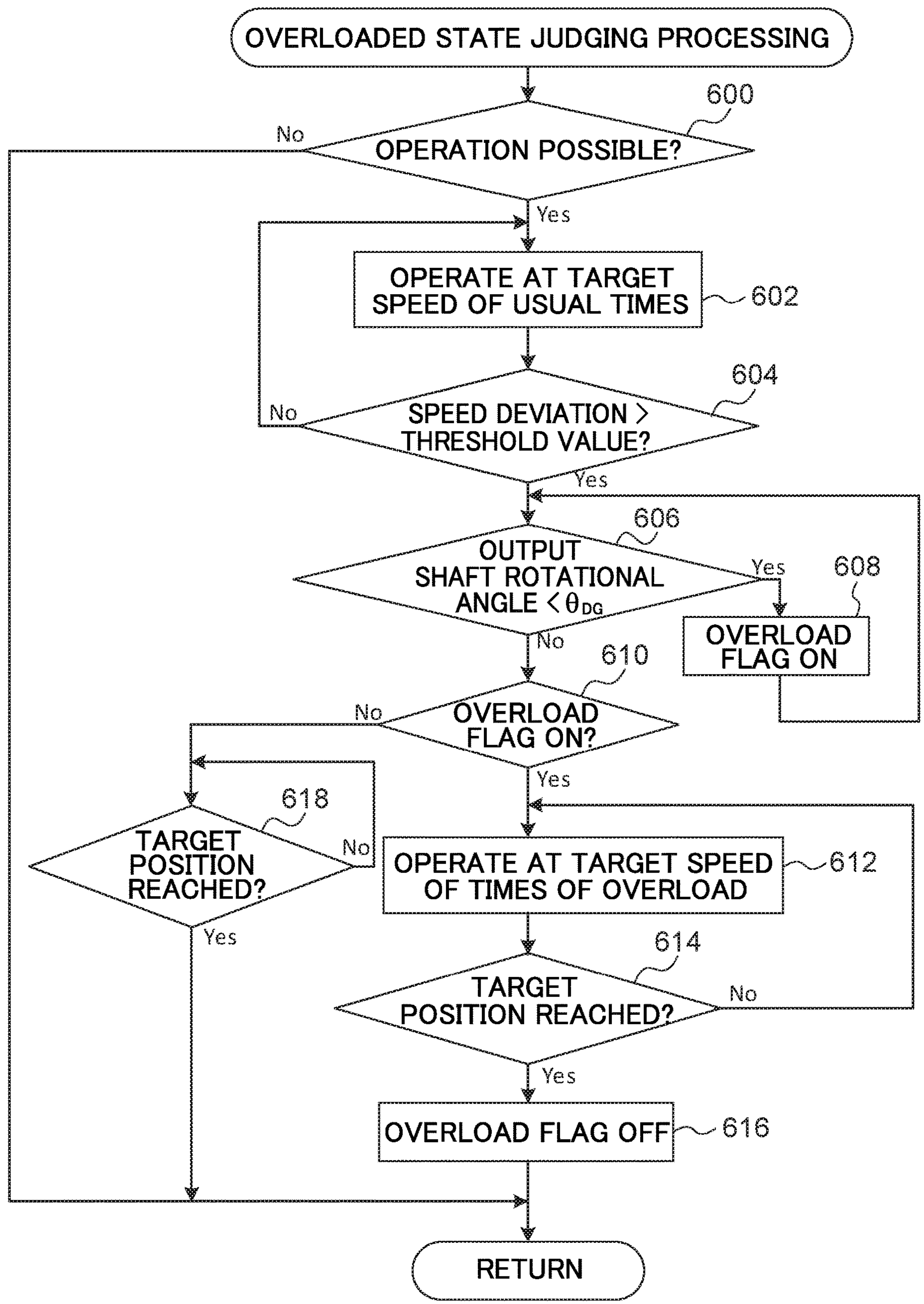
FIG. 6 is a flowchart showing an example of overloaded state judging processing of the wiper device relating to the embodiment of the present invention.
Figure 7:
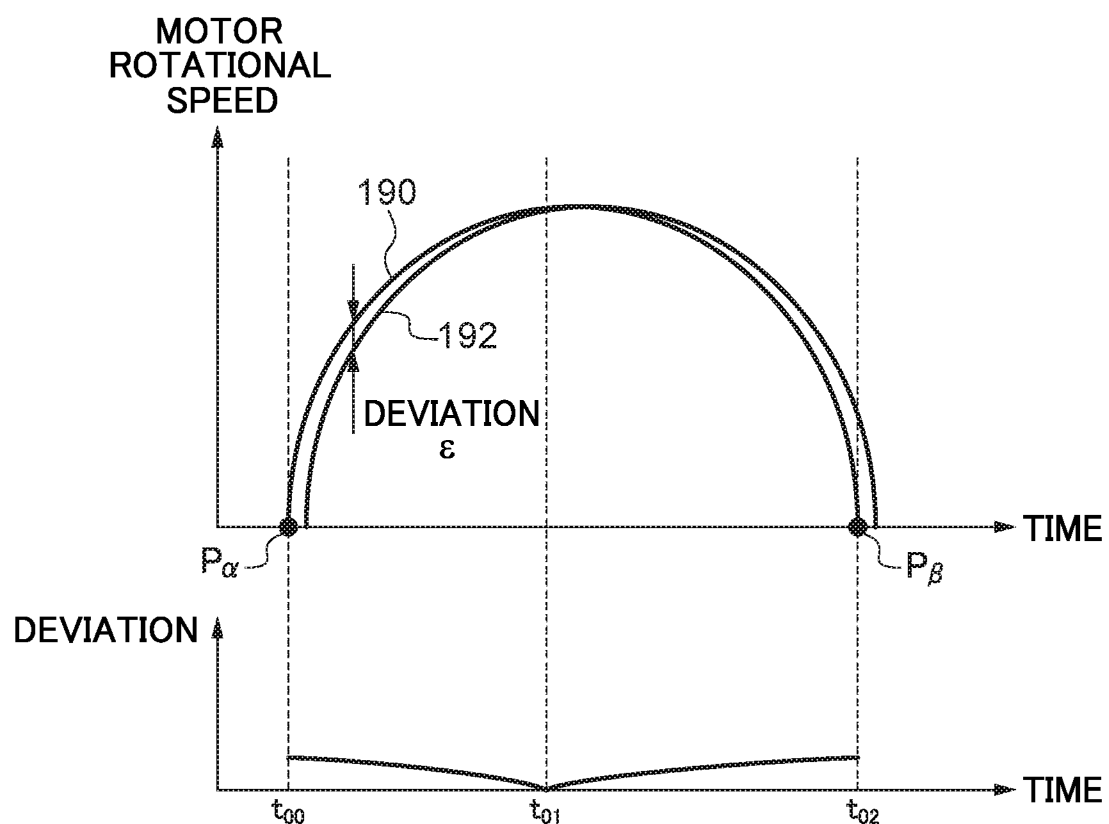
FIG. 7 is an explanatory drawing comparing target speed, actual speed, and deviation between the both of a wiper motor.

FIG. 6 is a flowchart showing an example of overloaded state judging processing of the wiper device 10 relating to the present embodiment. In step 600, it is judged whether conditions at which operation is possible, such as the wiper switch 50 is on and the temperature of the circuit substrate sensed by the thermistor RT is in a range in which the wiper device 10 can operate, or the like, are satisfied. If the judgment in step 600 is affirmative, the process moves on to step 602, and, if the judgment is negative, the processing returns.

In step 602, control for making the actual speed of the wiper motor 18 follow the target speed at usual times, i.e., the target speed that is the speed command value such as shown in FIG. 5A, is carried out. In step 604, it is judged whether or not the deviation between the target speed and the actual speed exceeds a deviation threshold value. If this judgment is affirmative, the process moves on to step 606, and, if this judgment is negative, control that makes the actual speed follow the target speed at usual times is continued.

In step 606, it is judged whether or not the rotational angle of the output shaft 32 is less than the switching angle $\theta_{DG}$. If this judgment is affirmative, in step 608, an overload flag is set to on, and the process returns to step 606.

In the case of a negative judgment in step 606, in step 610, it is judged whether or not the overload flag is on. In the case of an affirmative judgment, in step 612, control is carried out to make the actual speed of the wiper motor 18 follow the target speed at times of overload, i.e., the target speed 102 shown in FIG. 4. In this control, control is carried out in which the driving circuit 56 generates and applies, to the wiper motor 18, a voltage that gradually decreases within the predetermined time ta from a voltage, which makes the actual speed follow the target speed at usual times, to a voltage, which makes the actual speed follow the target speed at times of overload, and thereafter, the driving circuit 56 generates and applies, to the wiper motor 18, a voltage that makes the actual speed follow the target speed at times of overload.

In step 614, it is judged, from the rotational angle of the output shaft 32 detected by the rotational angle sensor 54, whether or not the wiper blades 28, 30 have reached the target position Pβ. In the case of an affirmative judgment, the process moves on to step 616, and, in step 616, the overload flag is set to off, and the processing returns. In the case of a negative judgment in step 614, control that makes the actual speed follow the target speed at times of overload is continued.

In the case of a negative judgment in step 610, in step 618, it is judged, from the rotational angle of the output shaft 32 detected by the rotational angle sensor 54, whether or not the wiper blades 28, 30 have reached the target position Pβ. In the case of an affirmative judgment, the processing returns. In the case of a negative judgment in step 618, control that makes the actual speed follow the target speed at usual times is continued.

As described above, in the present embodiment, in a case in which the deviation between the target speed and the actual speed of the output shaft 32 of the wiper motor 18 exceeds a predetermined deviation threshold value, the wiper motor 18 is considered to be overloaded, and the target speed is lowered, and rotation of the wiper motor is controlled such that the actual speed follows the lowered target speed. Due to this control, even in cases in which the resistance to the wiping operation of the wiper blades 28, 30 becomes large and the actual speed of the output shaft 32 falls, control that makes the actual speed follow the decreased target speed is possible, and overrunning of the wiper blades 28, 30 can be prevented, and the wiping operation can be controlled smoothly.

Further, in the present embodiment, it is judged whether or not the wiper motor 18 is overloaded, on the basis of the deviation between the target speed and the actual speed of the output shaft 32. Therefore, an overloaded state of the wiper motor 18 can be detected by a simple structure, and the wiping operation can be controlled smoothly as described above, without changing the structure of the existing wiper device 10.

The disclosure of Japanese Patent Application No. 2017-023256 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A wiper device comprising:

a wiper motor that causes wiper blades to carry out wiping operation;

a driving circuit that generates voltage that is supplied to the wiper motor; and a microcomputer comprising a processor configured to operate as:

a speed detecting section that detects a rotational speed of the wiper motor;

a judging section that calculates a deviation between a predetermined target rotational speed expressed by a speed command value and an actual rotational speed of an output shaft of the wiper motor detected by the speed detecting section, compares the calculated deviation to a predetermined value multiple points in time within a wiping operation period, and judges whether the wiper motor is in an overload state by determining whether the deviation at multiple points in time within the wiping operation period continues to exceed a predetermined value for a predetermined time or more, the predetermined time being a time shorter than the wiping operation period; and a control section that, when the judging judges that the deviation exceeds the predetermined value for the predetermined time or more, controls the driving circuit such that voltage for deceleration that is lower than a voltage for driving is supplied to the wiper motor.

2. The wiper device of claim 1, wherein the control section controls the driving circuit such that the voltage for deceleration is supplied to the wiper motor, by lowering the predetermined target rotational speed expressed by the speed command value.

3. The wiper device of claim 1, wherein the processor is further configured to function as:

a rotational angle detecting section that detects a rotational angle of the output shaft, wherein the control section controls the driving circuit such that the voltage for deceleration is supplied to the wiper motor in a case in which a state in which the deviation is greater than or equal to the predetermined value continues for the predetermined time or more and the rotational angle detected by the rotational angle detecting section reaches a predetermined switching angle that is near an intermediate angle of a range of rotational angles of the output shaft.

4. The wiper device of claim 1, wherein the control section controls the driving circuit such that voltage, which is gradually lowered from the voltage for driving to the voltage for deceleration, is supplied to the wiper motor, and thereafter controls the driving circuit such that the voltage for deceleration is supplied to the wiper motor.

5. The wiper device of claim 1, wherein the voltage for deceleration that is lower than the voltage for driving is supplied at least until the deviation becomes less than the predetermined value.

6. The wiper device of claim 2, wherein the processor is further configured to function as:

a rotational angle detecting section that detects a rotational angle of the output shaft, wherein the control section controls the driving circuit such that the voltage for deceleration is supplied to the wiper motor in a case in which a state in which the deviation is greater than or equal to the predetermined value continues for the predetermined time or more and the rotational angle detected by the rotational angle detecting section reaches a predetermined switching angle that is near an intermediate angle of a range of rotational angles of the output shaft.

7. The wiper device of claim 2, wherein the control section controls the driving circuit such that voltage, which is gradually lowered from the voltage for driving to the voltage for deceleration, is supplied to the wiper motor, and thereafter controls the driving circuit such that the voltage for deceleration is supplied to the wiper motor.

8. The wiper device of claim 3, wherein the control section controls the driving circuit such that voltage, which is gradually lowered from the voltage for driving to the voltage for deceleration, is supplied to the wiper motor, and thereafter controls the driving circuit such that the voltage for deceleration is supplied to the wiper motor.

9. The wiper device of claim 6, wherein the control section controls the driving circuit such that voltage, which is gradually lowered from the voltage for driving to the voltage for deceleration, is supplied to the wiper motor, and thereafter controls the driving circuit such that the voltage for deceleration is supplied to the wiper motor.

* * * * *